(12) United States Patent
Kuo

(10) Patent No.: US 7,988,340 B2
(45) Date of Patent: Aug. 2, 2011

(54) PRISM SHEET AND BACKLIGHT MODULE

(75) Inventor: Hao-Jan Kuo, Hsinchu County (TW)

(73) Assignee: Nano Precision Corporation, Hsinchu County (TW)

( * ) Notice: Subject to any disclaimer, the term of this patent is extended or adjusted under 35 U.S.C. 154(b) by 216 days.

(21) Appl. No.: 12/269,063

(22) Filed: Nov. 12, 2008

(65) Prior Publication Data
US 2010/0046200 A1    Feb. 25, 2010

(30) Foreign Application Priority Data

Aug. 22, 2008   (TW) ............................. 97132245 A

(51) Int. Cl.
*F21V 5/00*    (2006.01)

(52) U.S. Cl. .. 362/331; 362/97.2; 362/309; 362/311.01; 362/311.06; 362/620

(58) Field of Classification Search ........ 362/97.1–97.2, 362/309, 311.01, 311.06, 317, 331, 337, 362/339, 620, 626
See application file for complete search history.

(56) References Cited

U.S. PATENT DOCUMENTS

| | | | |
|---|---|---|---|
| 5,771,328 A | 6/1998 | Wortman et al. | |
| 6,354,709 B1 | 3/2002 | Campbell et al. | |
| 6,863,414 B2 * | 3/2005 | Ho | 362/603 |
| 2006/0146571 A1 * | 7/2006 | Whitney | 362/615 |
| 2007/0115407 A1 * | 5/2007 | Richard et al. | 349/112 |

FOREIGN PATENT DOCUMENTS

| | | |
|---|---|---|
| CN | 1396483 | 2/2003 |
| CN | 101153922 | 4/2008 |
| TW | I278662 | 4/2007 |

* cited by examiner

*Primary Examiner* — Stephen F Husar
*Assistant Examiner* — Meghan K Dunwiddie
(74) *Attorney, Agent, or Firm* — Jianq Chyun IP Office

(57) ABSTRACT

A prism sheet including a transparent substrate, a plurality of prism rods and at least one optical grating structure is provided. The transparent substrate has a first surface and a second surface opposite to the first surface. The prism rods are disposed on the first surface, wherein each of the prism rods extends along a first direction, and the prism rods are arranged along a second direction. The optical grating structure is disposed on the first surface and located between two adjacent ones of the prism rods, wherein the optical grating structure extends along the first direction. In addition, a backlight module using the above-mentioned prism sheet is also provided.

20 Claims, 15 Drawing Sheets

PRISM SHEET AND BACKLIGHT MODULE

CROSS-REFERENCE TO RELATED APPLICATION

This application claims the priority benefit of Taiwan application serial no. 97132245, filed on Aug. 22, 2008. The entirety of the above-mentioned patent application is hereby incorporated by reference herein and made a part of this specification.

BACKGROUND OF THE INVENTION

1. Field of the Invention

The present invention generally relates to an optical film and a light source module, and more particularly, to a prism sheet and a backlight module using the prism sheet.

2. Description of Related Art

FIG. 1A is a partial cross-sectional diagram of a conventional backlight module and FIG. 1B is a three dimensional diagram of the prism sheet in FIG. 1A. Referring to FIGS. 1A and 1B, a conventional backlight module 100 includes a reflective sheet 110, a plurality of cold cathode fluorescent lamps (CCFLs) 120, a bottom diffuser 130, a prism sheet 140 and a top diffuser 150, all of which are sequentially disposed from the rear side to the front side of the backlight module 100. The CCFLs 120 are capable of emitting a light beam 122. A part of the light beam 122 strikes the reflective sheet 110, and then is reflected by the reflective sheet 110 onto the bottom diffuser 130 and transmitted to the prism sheet 140. Another part of the light beam 122 directly strikes onto the bottom diffuser 130 and is transmitted onto the prism sheet 140.

The prism sheet 140 includes a transparent substrate 142 and a plurality of prism rods 144 disposed on the transparent substrate 142. Each of the prism rods 144 extends along a first direction D1, and the prism rods 144 are arranged along a second direction D2. The prism rods 144 have selectivity on the incident light beams 122 with different incident angles. That is, the prism rods 144 allow an incident light beam 122 with an incident angle within a particular angle range to be passed through, so that the light beam 122 emitted out of the prism sheet 140 is as perpendicular as possible to the top diffuser 150. Therefore a light collecting effect of the prism sheet 140 is achieved, and the backlight module 100 thereby is able to provide a surface light source with more concentrative light emitting angles. For example, the light ray 122a of the light beam 122 may pass through the prism rods 144 and reach the top diffuser 150. However, the light rays 122b and 122c of the light beam 122 would be reflected by the prismatic surfaces 114a and 144b of the prism rods 144 back onto the reflective sheet 110. Then, the reflective sheet 110 reflects the light rays 122b and 122c onto the prism sheet 140 so as to reuse the light rays 122b and 122c. The prism rods 144 allow a part of the above-mentioned reused light beam 122 to be passed through and reflect another part of the reused light beam 122 once more. So a part of the light beam 122 circulates between the prism rods 144 and the reflective sheet 110 many times until coming to an incident angle close to the angle of incidence of the light ray 122a and passing through the prism rods 144.

Since the light beam 122 emitted from the CCFLs 120 is a white light beam containing a plurality of wavelengths, and since the prism rods 144 have different refractive indexes depending on different wavelengths of light, a dispersion phenomenon of the light beam 122 passing through the prism rods 144 occurs, which leads to color nonuniformity of the surface light source provided by the backlight module 100.

In addition, since the profile of the prism rods 144 (i.e., the crest lines L1 at the top of the prism rods 144 and the boundary lines L2 between any two adjacent prism rods 114) is apparent, the prism rods 144 and the pixel array (not shown) of the liquid crystal panel disposed over the backlight module 100 generate moire fringes or Newton's rings, which further results in nonuniform brightness of the surface light source provided by the backlight module 100. Besides, if the prism rods 144 with the apparent profile have defects, the defects are more easily noticeable.

SUMMARY OF THE INVENTION

Accordingly, the present invention is directed to a prism sheet capable of effectively reducing the influence of dispersion phenomenon on the color uniformity of the emitted light.

The present invention is also directed to a backlight module able to provide a surface light source with more uniform color and brightness.

Other advantages of the present invention should be further indicated by the disclosures of the present invention, and omitted herein for simplicity.

To achieve one of, a part of or all of the above-mentioned advantages, or to achieve other advantages, an embodiment of the present invention provides a prism sheet, which includes a transparent substrate, a plurality of prism rods and at least one optical grating structure. The transparent substrate has a first surface and a second surface opposite to the first surface. The prism rods are disposed on the first surface, wherein each of the prism rods extends along a first direction, and the prism rods are arranged along a second direction. The optical grating structure is disposed on the first surface and located between two adjacent prism rods, wherein the optical grating structure extends along a first direction.

Another embodiment of the present invention provides a backlight module, which includes at least one light emitting element and a first prism sheet, wherein the first prism sheet is the above-mentioned prism sheet. The light emitting element is capable of emitting a light beam. The first prism sheet is disposed in the transmission path of the light beam.

In addition to the prism rods, the prism sheet of the embodiment of the present invention further has at least one optical grating structure. Since the dispersion phenomenon produced by the diffraction effect of the optical grating structure may countervail at least one part of the dispersion phenomenon produced by the refraction effect of the prism rods, the prism sheet of the embodiment of the present invention may effectively reduce the influence of the dispersion phenomenon on the emitted light, which further enhances the color uniformity of the surface light source provided by the backlight module using the prism sheet.

In addition, since the optical grating structure enables the light diffracted so as to fog (i.e., to blur) the profile of the prism rods, the backlight module using the prism sheet may provide a surface light source with more uniform brightness. Furthermore, when a liquid crystal panel is disposed over the prism sheet, the moire fringes and the Newton's rings generated by the prism rods and the pixel structure of the liquid crystal panel may be effectively suppressed. The diffraction effect of the optical grating structures is able to fog the defects on the prism rods as well, which makes the defects not easily observed so as to further increase the production yield of the prism sheet and the uniformity of the surface light source provided by the backlight module.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following, the depicted embodiments together with the included drawings are intended to explain the feasibility of the present invention, wherein a same notation or a similar notation is for marking the same or the similar portions. Note that the diagrams are simplified and not in an accurate scale to the real objects. In addition, some of expression words hereinafter regarding direction or orientation, such as 'up', 'down', 'in front', 'behind', 'left' and 'right', and the like, are to describe, not to limit, the present invention.

In the present specification, a normal vector of a surface of an object refers to a vector pointing outwards from the object and perpendicular to the surface.

The First Embodiment

Figure 1A:
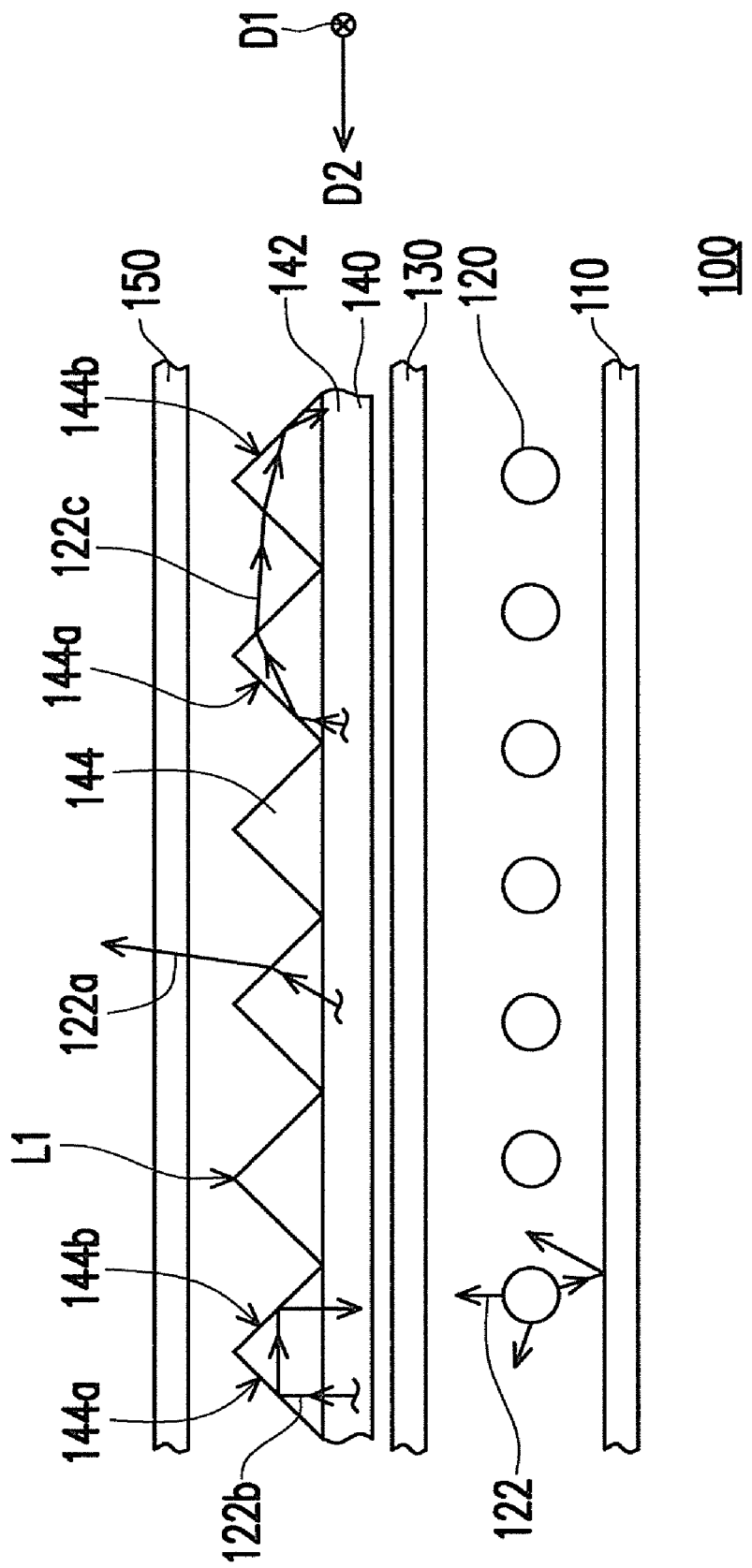
FIG. 1A is a localized cross-sectional diagram of a conventional backlight module.
Figure 1B:
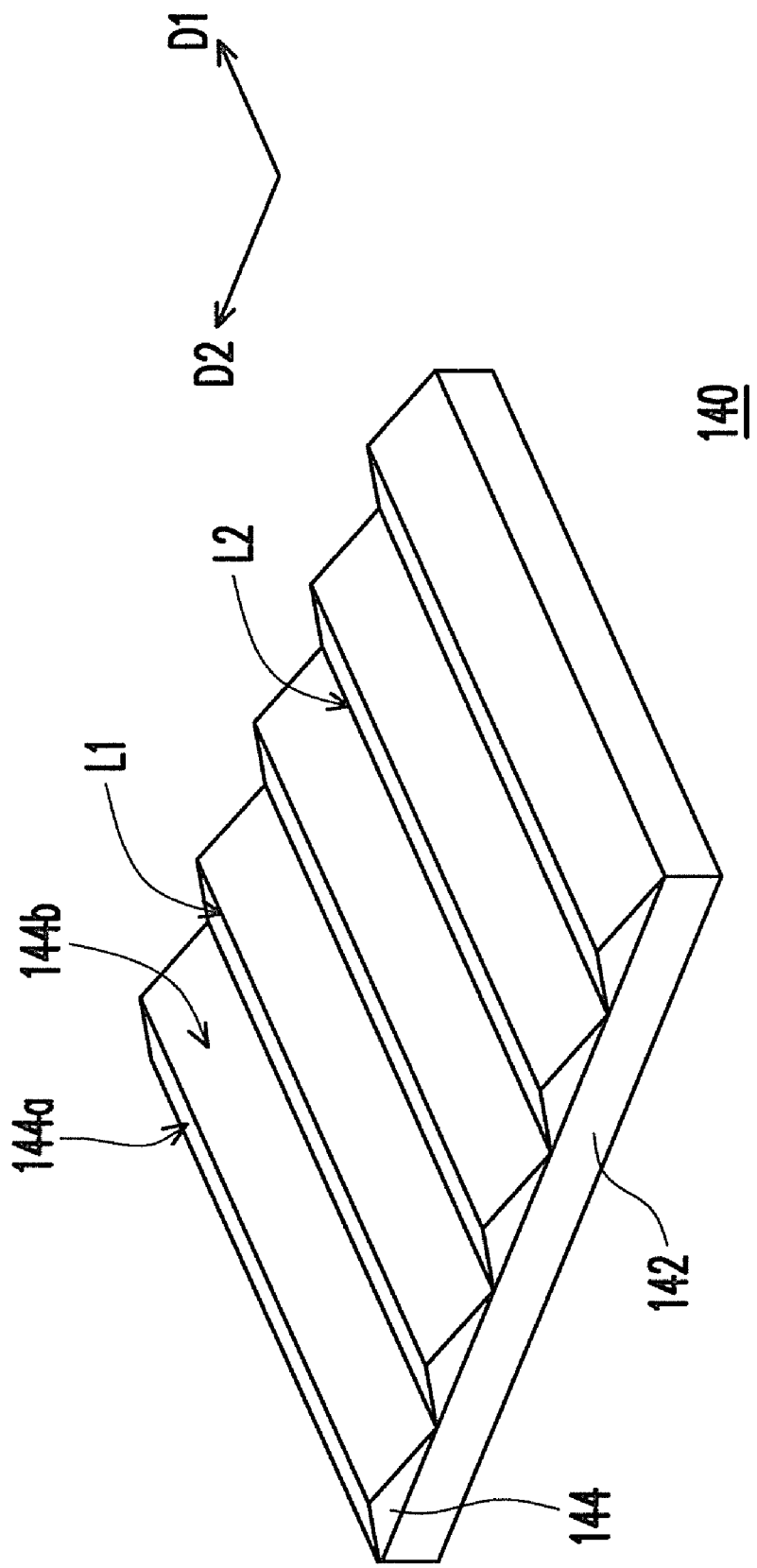
FIG. 1B is a three dimensional diagram of the prism sheet in FIG. 1A.
Figure 2A:
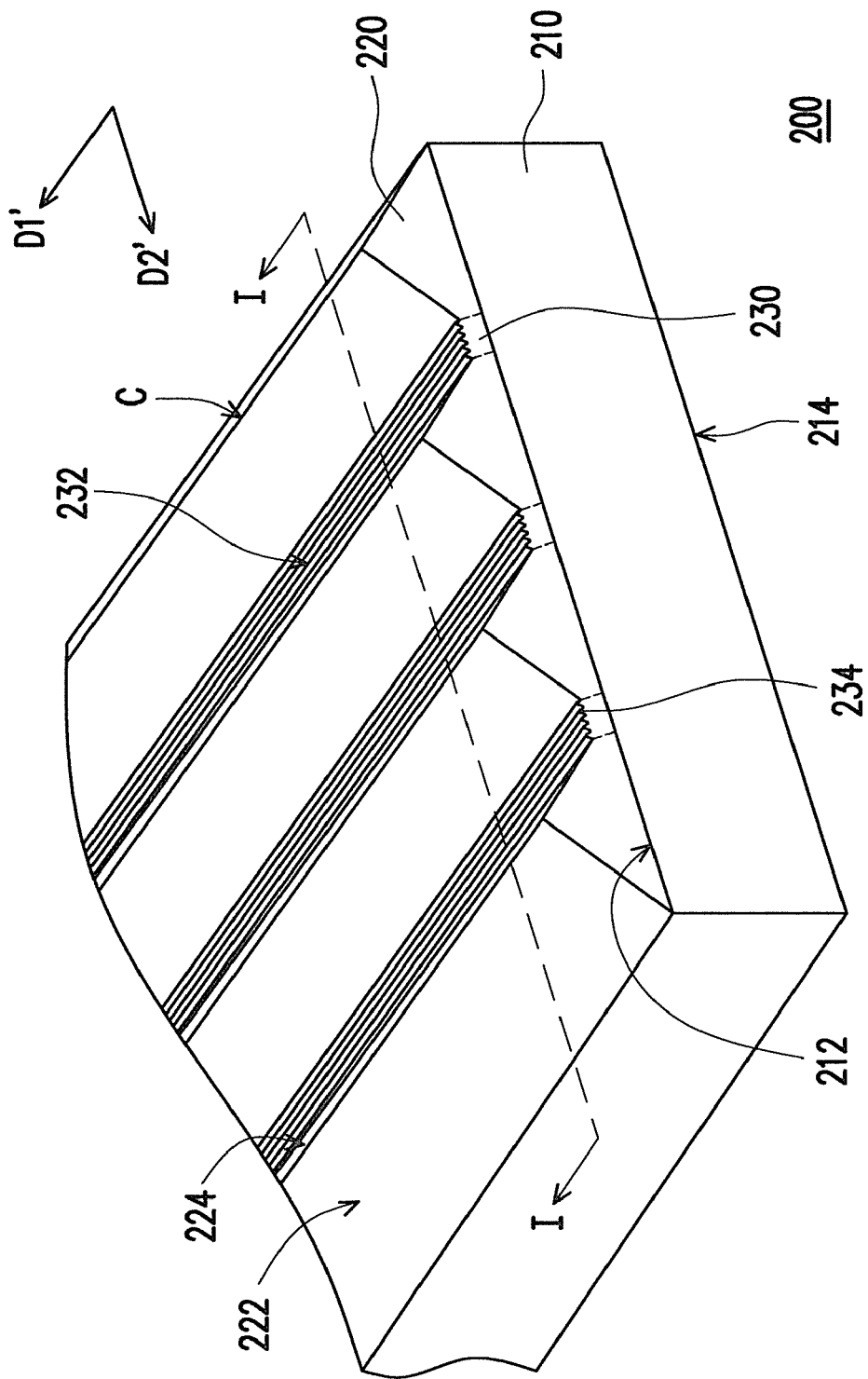
FIG. 2A is a three dimensional diagram of a prism sheet according to the first embodiment of the present invention.
Figure 2B:
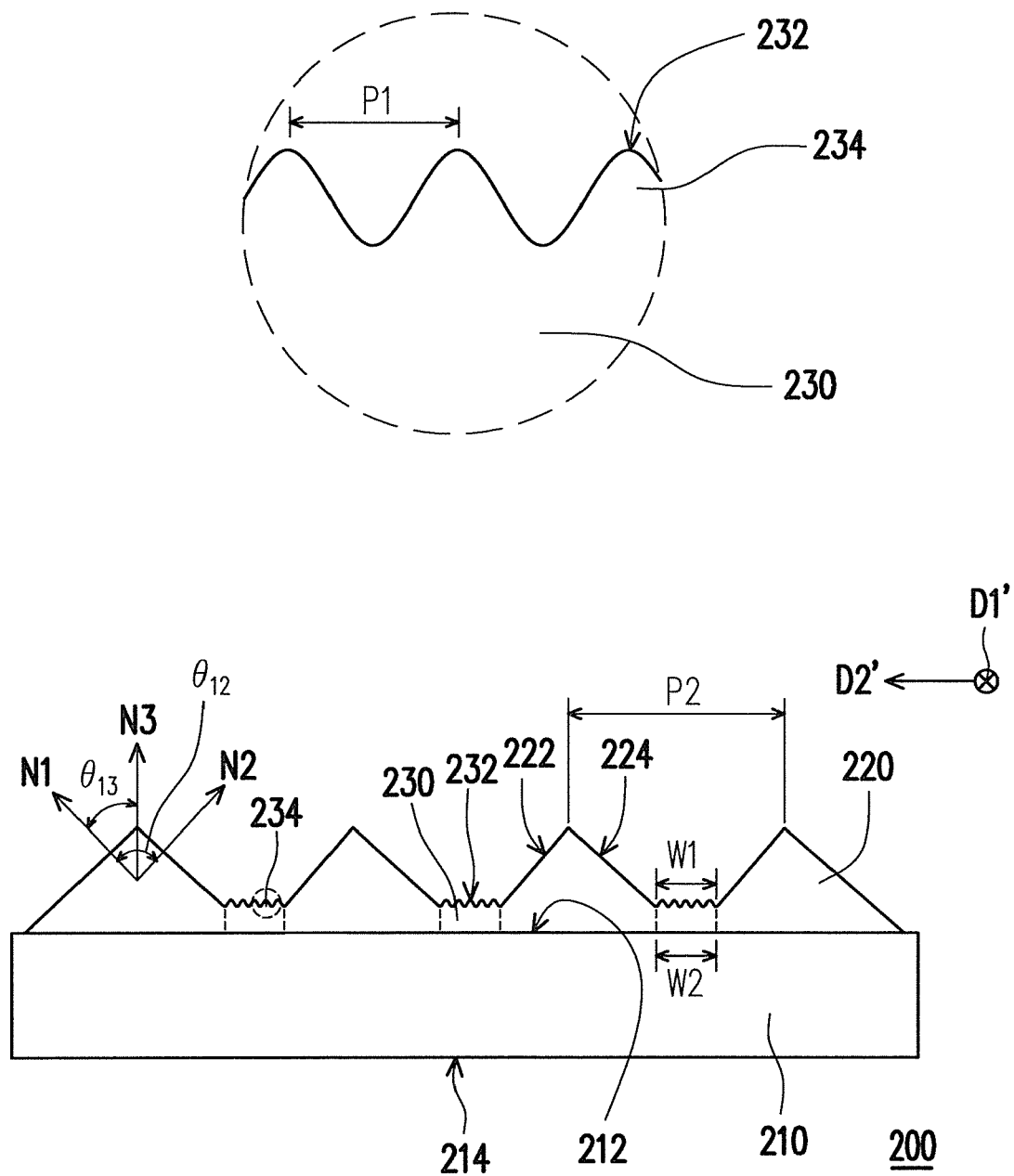
FIG. 2B is a cross-sectional diagram of the prism sheet of FIG. 2A along line I-I.

FIG. 2A is a three dimensional diagram of a prism sheet according to the first embodiment of the present invention, and FIG. 2B is a cross-sectional diagram of the prism sheet of FIG. 2A along line I-I. Referring to FIGS. 2A and 2B, a prism sheet 200 of the embodiment includes a transparent substrate 210, a plurality of prism rods 220 and a plurality of optical grating structures 230. The transparent substrate 210 has a first surface 212 and a second surface 214 opposite to the first surface 212. The prism rods 220 are disposed on the first surface 212, wherein each of the prism rods 220 extends along a first direction D1' and the prism rods 220 are arranged along a second direction D2'. In the embodiment, the first direction D1' is substantially perpendicular to the second direction D2'.

In the embodiment, each of the prism rods 220 has a first prismatic surface 222 and a second prismatic surface 224. The first prismatic surface 222 and the second prismatic surface 224 are located at the same side of the transparent substrate 210, and the second prismatic surface 224 is connected to the first prismatic surface 222. In more detail, the boundary between the first prismatic surface 222 and the second prismatic surface 224 of each of the prism rods 220 is a crest line C extending along the first direction D1'. The first prismatic surface 222 has a first normal vector N1, the second prismatic surface 224 has a second normal vector N2, and the first surface 212 has a third normal vector N3. In the embodiment, the included angle $\theta_{12}$ between the first normal vector N1 and the second normal vector N2 ranges from 70° to 110°. In addition, in the embodiment, the included angle $\theta_{13}$ between the first normal vector N1 and the third normal vector N3 ranges from 35° to 55°.

Since the included angle $\theta_{12}$ and the included angle $\theta_{13}$ are within the above-mentioned ranges, the first prismatic surface 222 and the second prismatic surface 224 allow the light obliquely striking the second surface 214 at an appropriate angle of incidence to pass through and then to be emitted out of the first prismatic surface 222 or the second prismatic surface 224 in a direction nearly perpendicular to the first surface 212, which makes the prism sheet 200 have a light collecting effect. In addition, the light obliquely striking the second surface 214 at a too small angle of incidence or normally striking the second surface 214 and the light obliquely striking the second surface 214 at a too large angle of incidence would be total internal reflected by the first prismatic surface 222 and the second prismatic surface 224 back to the second surface 214.

Each of the optical grating structures 230 is disposed on the first surface 212 and located between two adjacent prism rods 220. Each optical grating structure 230 extends along the first direction D1'. In the embodiment, each of the optical grating structures 230 has an optical grating surface 232 facing away from the transparent substrate 210. Each of the optical grating structures 230 includes a plurality of protrusive strips 234 located at the optical grating surface 232. In the embodiment, each of the protrusive strips 234 extends along the first direction D1', and the protrusive strips 234 are arranged along the second direction D2'. In addition, in the embodiment, each two adjacent protrusive strips 234 have a pitch P1 along the second direction D2', the pitch P1 ranges from 0.5 μm to 3 μm, and the value of the pitch P1 is related to the diffraction effect of the optical grating surface 232.

Figure 3:
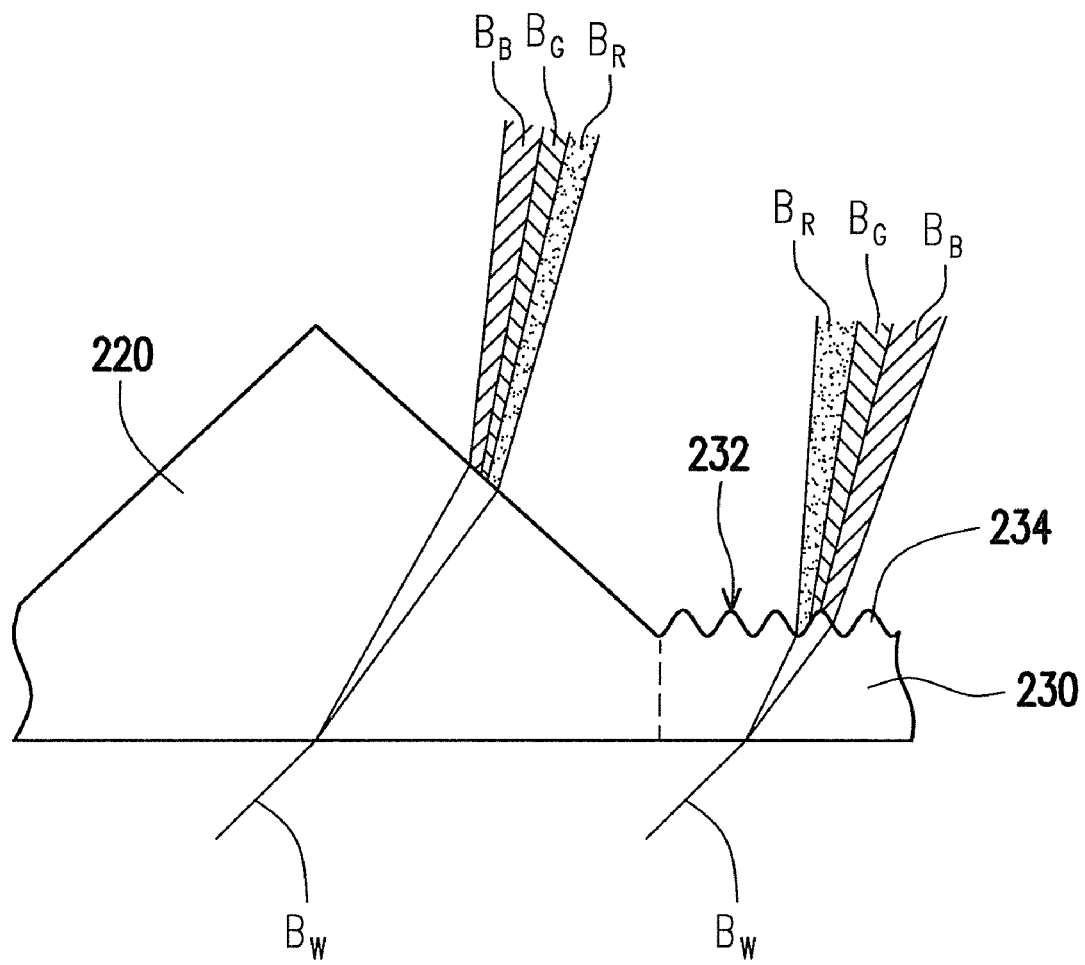
FIG. 3 is a diagram showing the dispersion phenomenon of the prism rod 220 and the optical grating structure 230.

FIG. 3 is a diagram showing the dispersion phenomenon of the prism rods 220 and the optical grating structures 230. Referring to FIG. 3, when a white light beam $B_W$ obliquely strikes the prism rods 220, the white light beam $B_W$ is refracted by the prism rods 220. The prism rods 220 have different refractive indexes depending on different wavelengths of the light. Therefore, when the white light beam $B_W$ passes through the prism rods 220, a dispersion phenomenon occurs, wherein the less the wavelength of the light is, the greater the spatially deflected angle of the light caused by the refraction effect of the prism rods 220 is; the greater the wavelength is, the less the spatially deflected angle of the light is. For example, when the white light beam $B_W$ passes through the prism rods 220, the spatially deflected angle of the red light beam $B_R$ generated by the dispersion phenomenon with respect to the white light beam $B_W$ is less than the spatially deflected angle of the dispersed green light beam $B_G$ with respect to the white light beam $B_W$; similarly, the spatially deflected angle of the dispersed green light beam $B_G$ with respect to the white light beam $B_W$ is less than the spatially deflected angle of the dispersed blue light beam $B_B$ with respect to the white light beam $B_W$.

On the other hand, the white light beam $B_W$ generates a diffraction effect after passing through the optical grating surfaces 232, and the diffraction angles are different depending on different wavelengths of light. In more detail, the less the wavelength is, the less the spatially deflected angle of the light caused by the diffraction effect is; the greater the wavelength is, the greater the spatially deflected angle of the light caused by the diffraction effect is. For example, the spatially deflected angle of the red light beam $B_R$ is greater than that of the green light beam $B_G$; the spatially deflected angle of the green light beam $B_G$ is greater than that of the blue light beam $B_B$. This kind of dispersion effect has a result opposite to the dispersion effect of the prism rods 220, so that the dispersion effect of the optical grating structures 230 countervails at least one part of the dispersion effect of the prism rods 220. In this way, the prism sheet 200 of the embodiment (as shown in FIG. 2A) is able to effectively reduce the influence of the dispersion phenomenon on the color uniformity of the emitted light.

Referring to FIGS. 2A and 2B again, in the embodiment, the pitch P2 of each two adjacent prism rods 220 in the second direction D2' ranges from 30 μm to 150 μm. In the embodiment, the ratio of the width W1 of each of the optical grating surfaces 232 in the second direction D2' over the pitch P2 of the prism rods 220 in the second direction D2' ranges from 3% to 50%. The less the ratio of the width W1 over the pitch P2 is, the less the dispersion effect of the optical grating surfaces 232 is in comparison with the dispersion effect of the prism rods 220, and the less the contribution of the dispersion effect of the optical grating surfaces 232 to countervail the dispersion effect of the prism rods 220 is. On the contrary, the greater the ratio of the width W1 over the pitch P2 is, the greater the contribution of the dispersion effect of the optical grating surfaces 232 to countervail the dispersion effect of the prism rods 220 is. In the embodiment, each of the optical grating structures 230 has the same width W2 in the second direction D2'. However in other embodiments, the width W2 of each of the optical grating structures 230 is different from at least one part of the others.

Besides, the diffraction nature of the optical grating structures 230 may be used to fog the profile of the prism rods 220. Therefore, when a liquid crystal panel (not shown) is disposed over the prism sheet 200, the moire fringes and the Newton rings generated by the prism rods 220 and the pixel structure of the liquid crystal panel may be effectively suppressed. The diffraction effect of the optical grating structures is able to fog the defects on the prism rods as well, which makes the defects more hard observed so as to further increase the production yield of the prism sheet 200.

In the embodiment, the optical grating structures 230 and the prism rods 220 are integrally formed, the optical grating structures 230 and the transparent substrate 210 are individually formed, and the prism rods 220 and the transparent substrate 210 are individually formed as well. However, in other embodiments, the optical grating structures 230, the prism rods 220 and the transparent substrate 210 are integrally formed or respectively individually formed.

The Second Embodiment

Figure 4A:
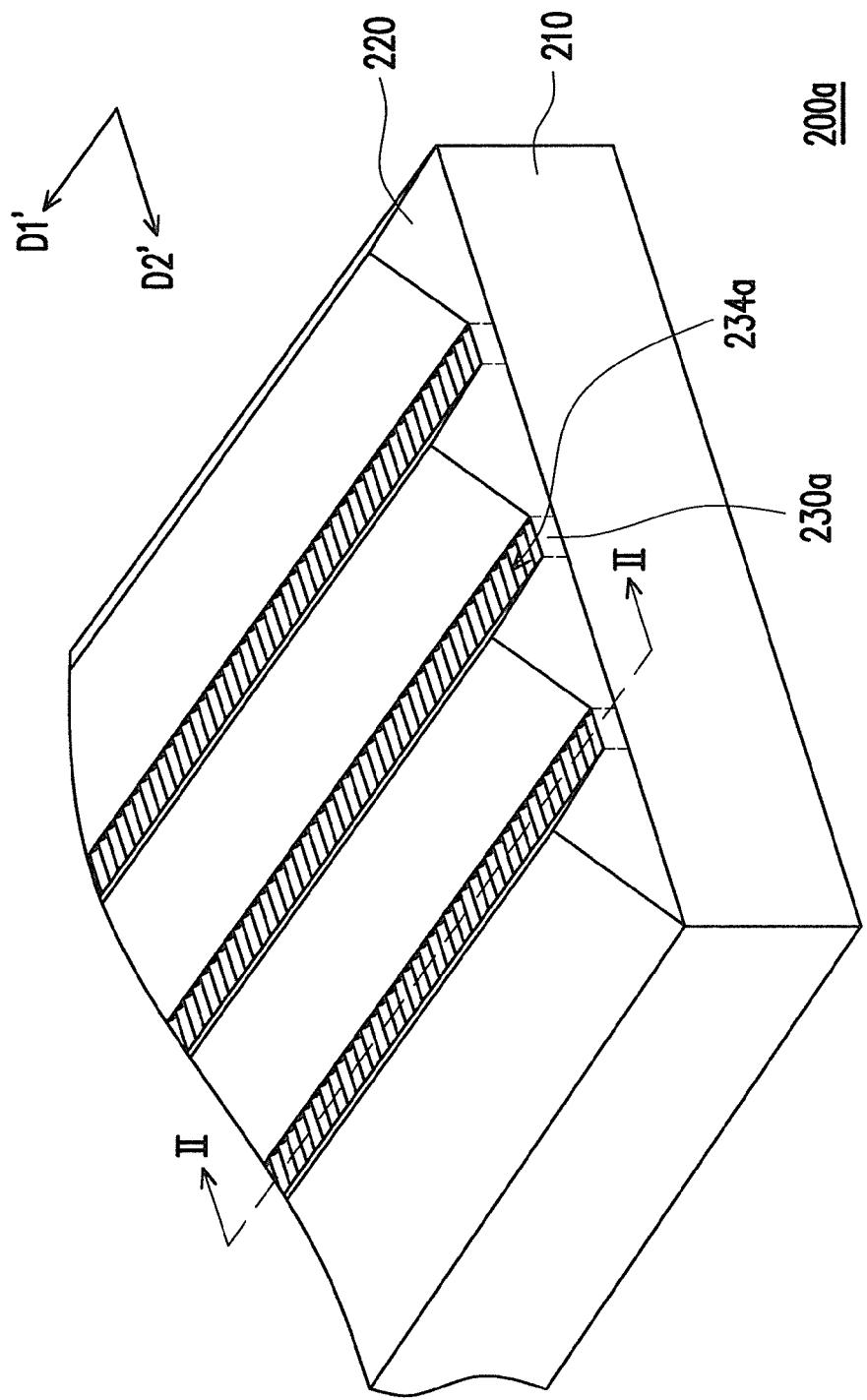
FIG. 4A is a three dimensional diagram of a prism sheet according to the second embodiment of the present invention.
Figure 4B:
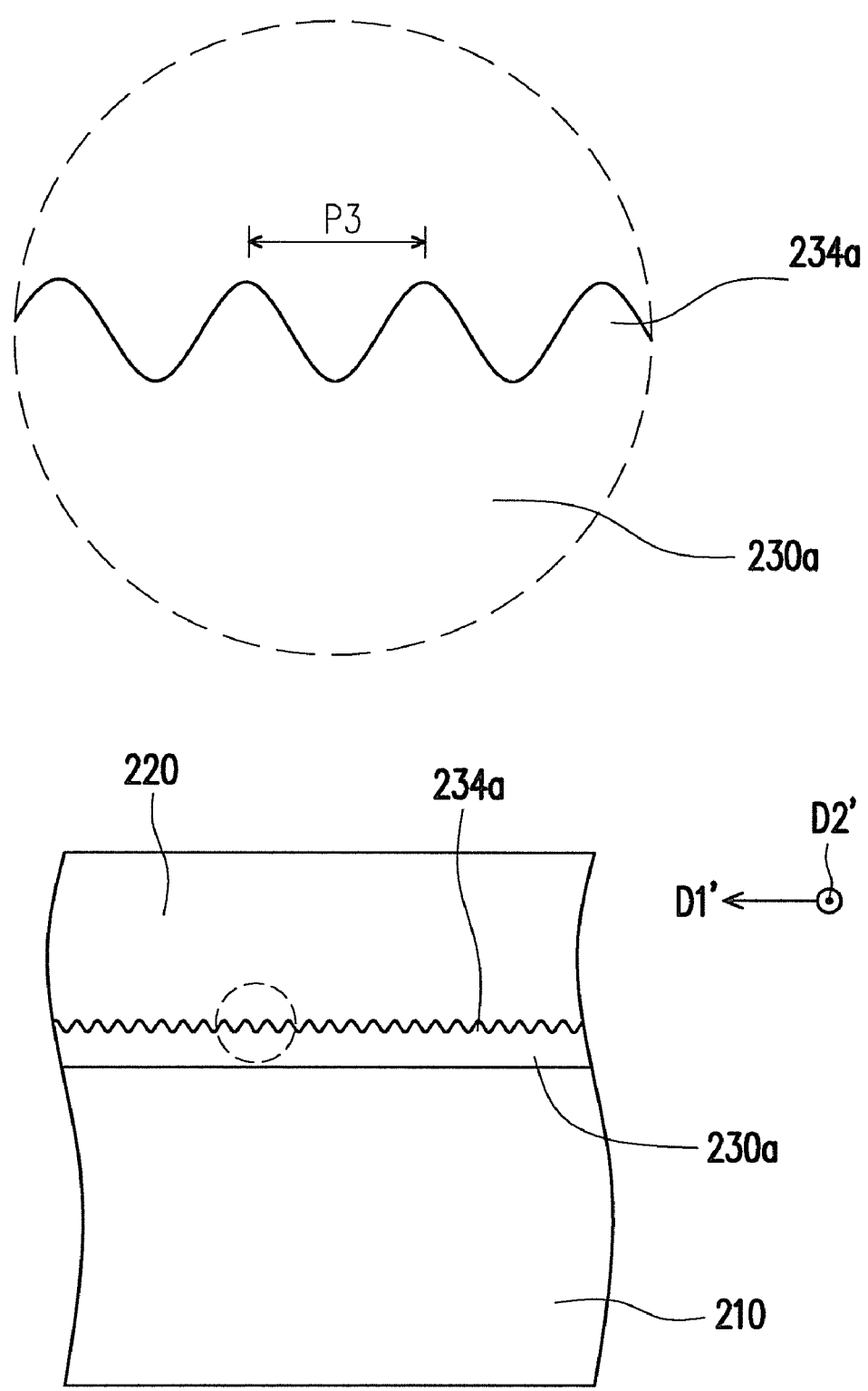
FIG. 4B is a cross-sectional diagram of the prism sheet of FIG. 4A along line II-II.

FIG. 4A is a three dimensional diagram of a prism sheet according to the second embodiment of the present invention, and FIG. 4B is a cross-sectional diagram of the prism sheet of FIG. 4A along line II-II. Referring to FIGS. 4A and 4B, the prism sheet 200a of the embodiment is similar to the above-mentioned prism sheet 200 (referring to FIG. 2A), and the differences between them are as follows. The protrusive strips 234a of each of the optical grating structures 230a in the prism sheet 200a extend along the second direction D2', and the protrusive strips 234a are arranged along the first direction D1'. In the embodiment, each two adjacent protrusive strips 234a have a pitch P3 in the first direction D1', and the pitch P3 ranges from 0.5 μm to 3 μm. The dispersion phenomenon of the optical grating structures 230a is similar to that of the optical grating structures 230 (referring to FIG. 2A) and is not repeated herein.

The Third Embodiment

Figure 5A:
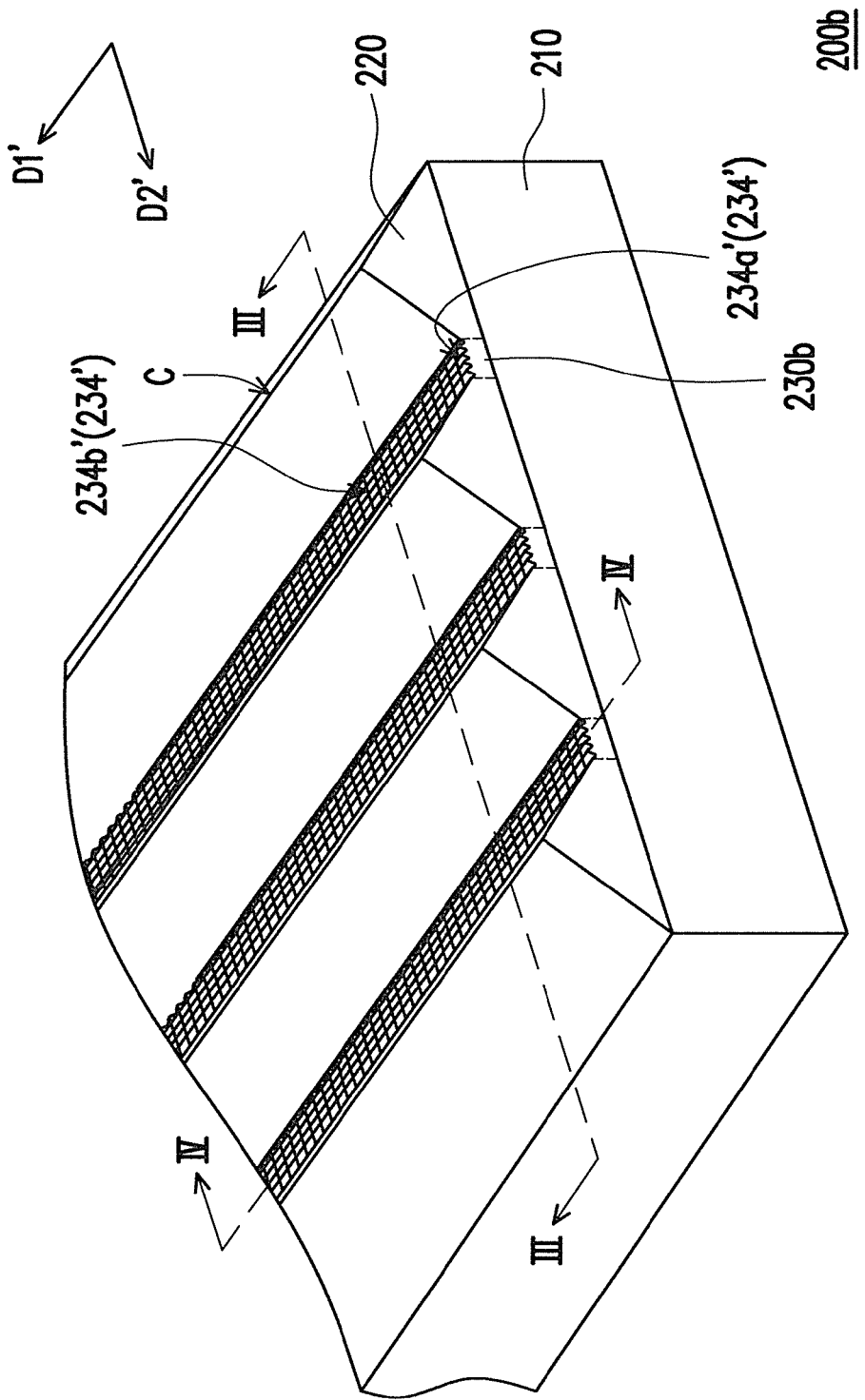
FIG. 5A is a three dimensional diagram of a prism sheet according to the third embodiment of the present invention.
Figure 5B:
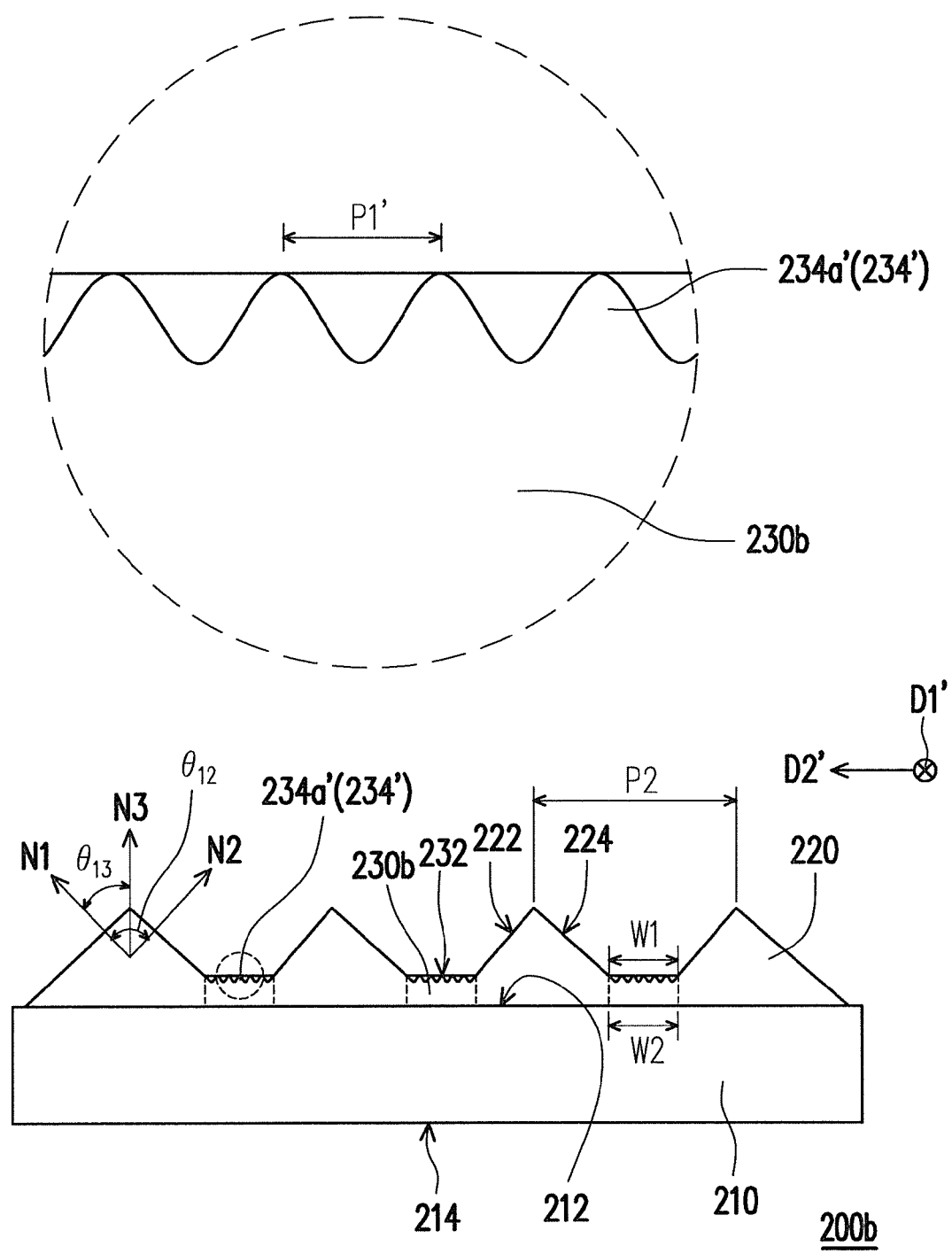
FIG. 5B is a cross-sectional diagram of the prism sheet of FIG. 5A along line III-III.
Figure 5C:
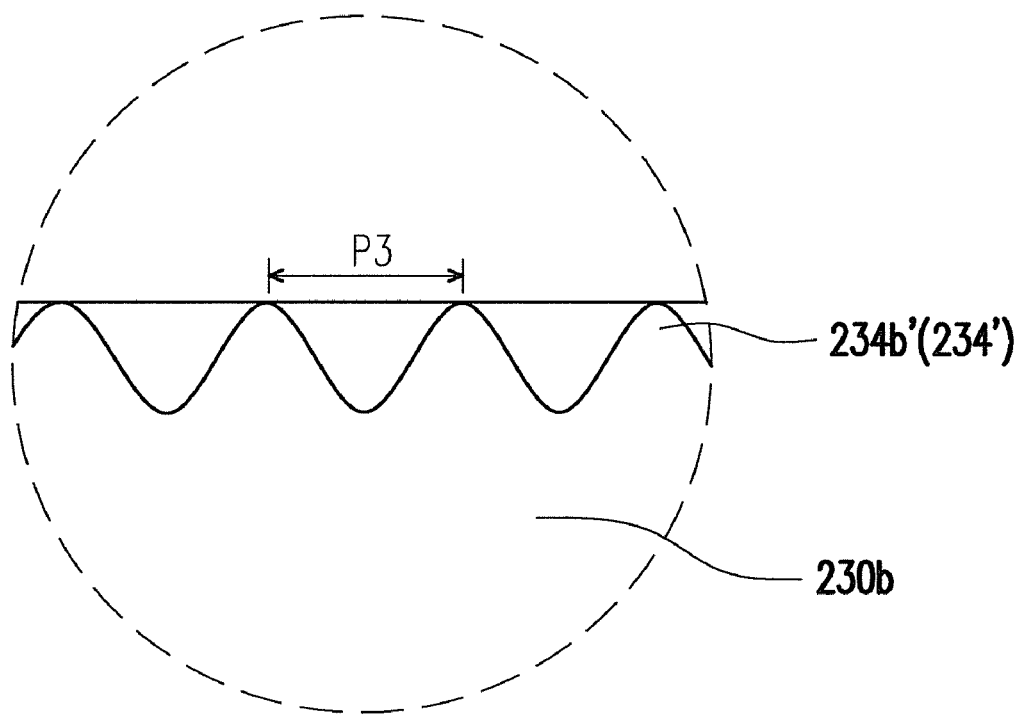
FIG. 5C is a localized cross-sectional diagram of the prism sheet of FIG. 5A along line IV-IV.
Figure 5C:
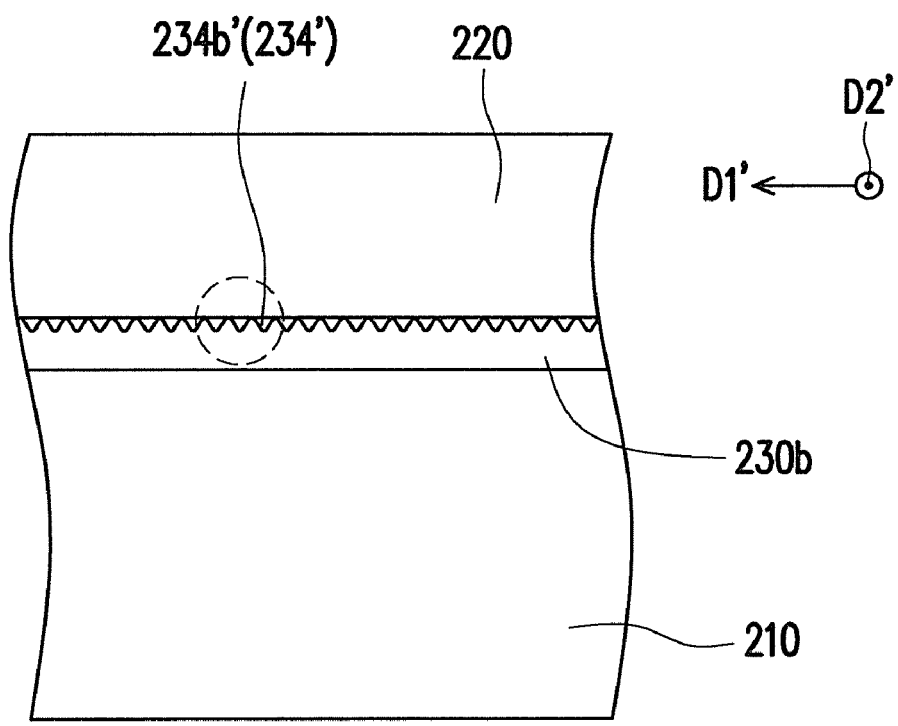

FIG. 5A is a three dimensional diagram of a prism sheet according to the third embodiment of the present invention, FIG. 5B is a cross-sectional diagram of the prism sheet of FIG. 5A along line III-III, and FIG. 5C is a localized cross-sectional diagram of the prism sheet of FIG. 5A along line IV-IV. Referring to FIGS. 5A-5C, the prism sheet 200b of the embodiment is similar to the above-mentioned prism sheet 200 (as shown in FIG. 2A), and the differences between them are as follows. In the prism sheet 200b, each of the optical grating structures 230b has a plurality of protrusive strips 234', and the protrusive strips 234' are sorted into a plurality of first protrusive strips 234a' and a plurality of second protrusive strips 234b'. Each of the first protrusive strips 234a' extends along a first direction D1' and the first protrusive strips 234a' are arranged along a second direction D2'. Each of the second protrusive strips 234b' extends along the second direction D2', and the second protrusive strips 234b' are arranged along the first direction D1'. The first protrusive strips 234a' and the second protrusive strips 234b' are interlaced with each other.

In the embodiment, each two adjacent first protrusive strips 234a' have a pitch P1' in the second direction D2', and each two adjacent second protrusive strips 234b' have a pitch P3' in the first direction D1'. Both the pitches P1' and P3' range from 0.5 μm to 3 μm, wherein the pitch P1' and the pitch P3' may be equal to each other or different from each other. The optical grating structures 230b may make the incident light diffracted in both directions (i.e. the first direction D1' and the second direction D2'), and have the optical effects combining those of the above-mentioned optical grating structures 230 (as shown in FIG. 2A) and the optical grating structures 230a (as shown in FIG. 4A).

It should be noted that the present invention does not limit the number of the optical grating structures of a prism sheet. The number of the optical grating structures may be plural or single one, referring to the following two embodiments.

The Fourth Embodiment

Figure 6:
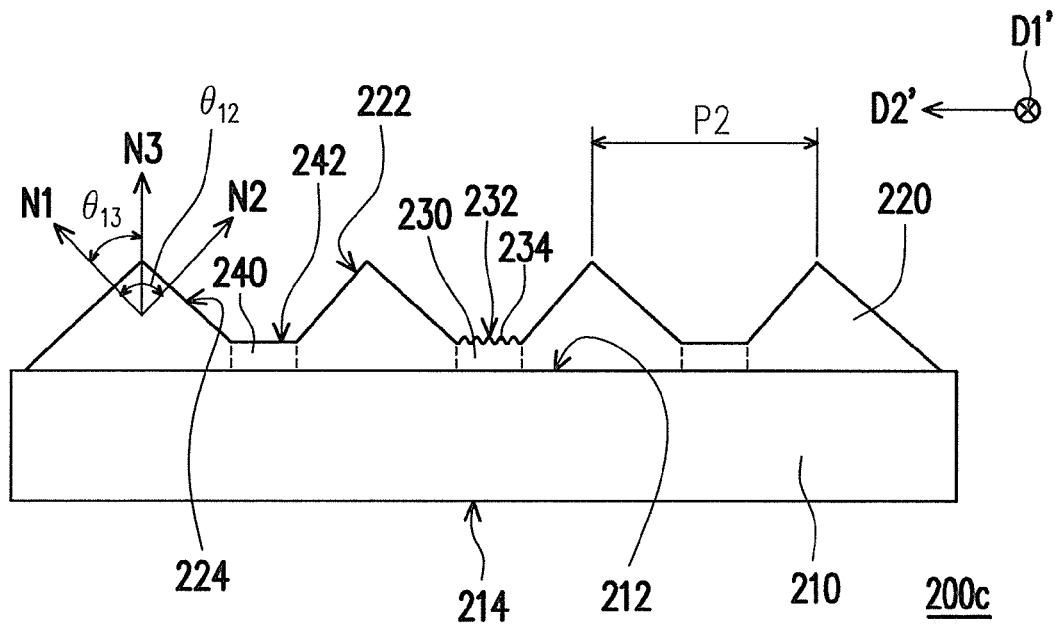
FIG. 6 is a cross-sectional diagram of a prism sheet according to the fourth embodiment of the present invention.

FIG. 6 is a cross-sectional diagram of a prism sheet according to the fourth embodiment of the present invention. Referring to FIG. 6, the prism sheet 200c of the embodiment is similar to the above-mentioned prism sheet 200 (as shown in FIG. 2B), and the differences between them are as follows. The prism sheet 200c of the embodiment has only one optical grating structure 230. In addition, the prism sheet 200c further includes a plurality of connecting structures 240, and each connecting structure 240 connects another two adjacent prism rods 220. Each connecting structure 240 has a connecting surface 242 connecting the first prismatic surface 222 of one of the another two adjacent prism rods 220 and the second prismatic surface 224 of the other one of the another two adjacent prism rods 220.

The present invention does not limit that the number of the connecting structures 240 of the prism sheet 200c must be plural, and does not limit that the number of the optical grating structure 230 of the prism sheet 200c must be single. In other embodiments, the prism sheet has a connecting structure and a plurality of optical grating structures. Alternatively, the prism sheet may simultaneously have a plurality of connecting structures and a plurality of optical grating structures, and the connecting structures and the optical grating structures may be arranged alternately or in any sequence. The more the number of the optical grating structures 230 is, the more effectively the dispersion effect generated by the optical grating structures 230 may countervail the dispersion effect of the prism rods.

The Fifth Embodiment

Figure 7:
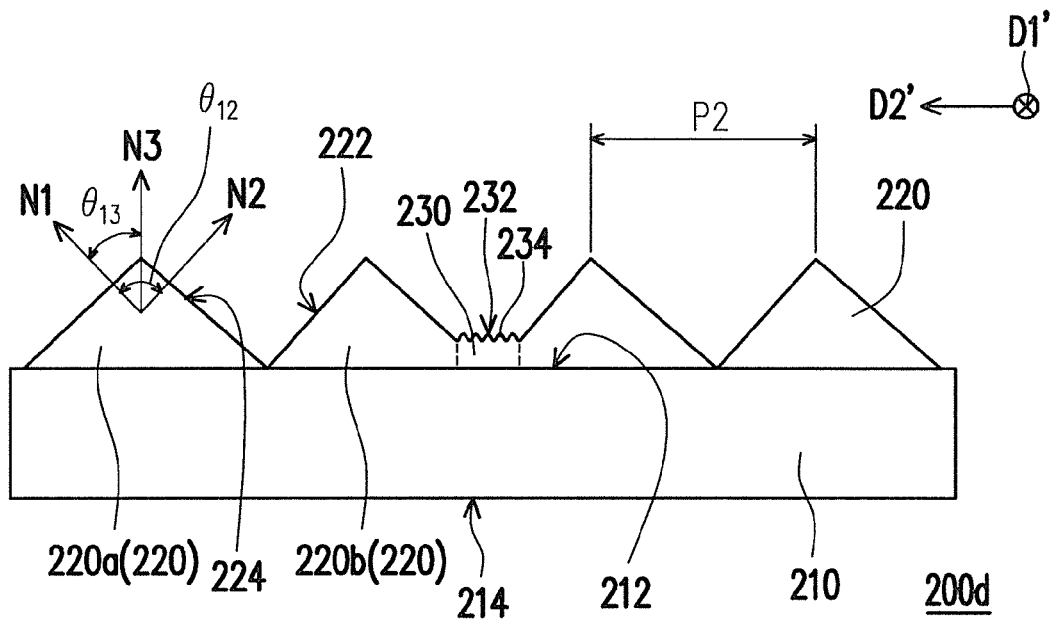
FIG. 7 is a cross-sectional diagram of a prism sheet according to the fifth embodiment of the present invention.

FIG. 7 is a cross-sectional diagram of a prism sheet according to the fifth embodiment of the present invention. Referring to FIG. 7, the prism sheet 200d of the embodiment is similar to the above-mentioned prism sheet 200c (as shown in FIG. 6), and the differences between them are as follows. In the prism sheet 200d, there is neither optical grating structure nor the above-mentioned connecting structure between partial two adjacent prism rods 220 (for example, between the prism rods 220a and 220b). In the embodiment, the edges of partial two adjacent prism rods 220 (for example, the prism rods 220a and 220b) are joined by each other, but in other embodiments, the edges of partial two adjacent prism rods are not joined by each other.

The Sixth Embodiment

Figure 8A:
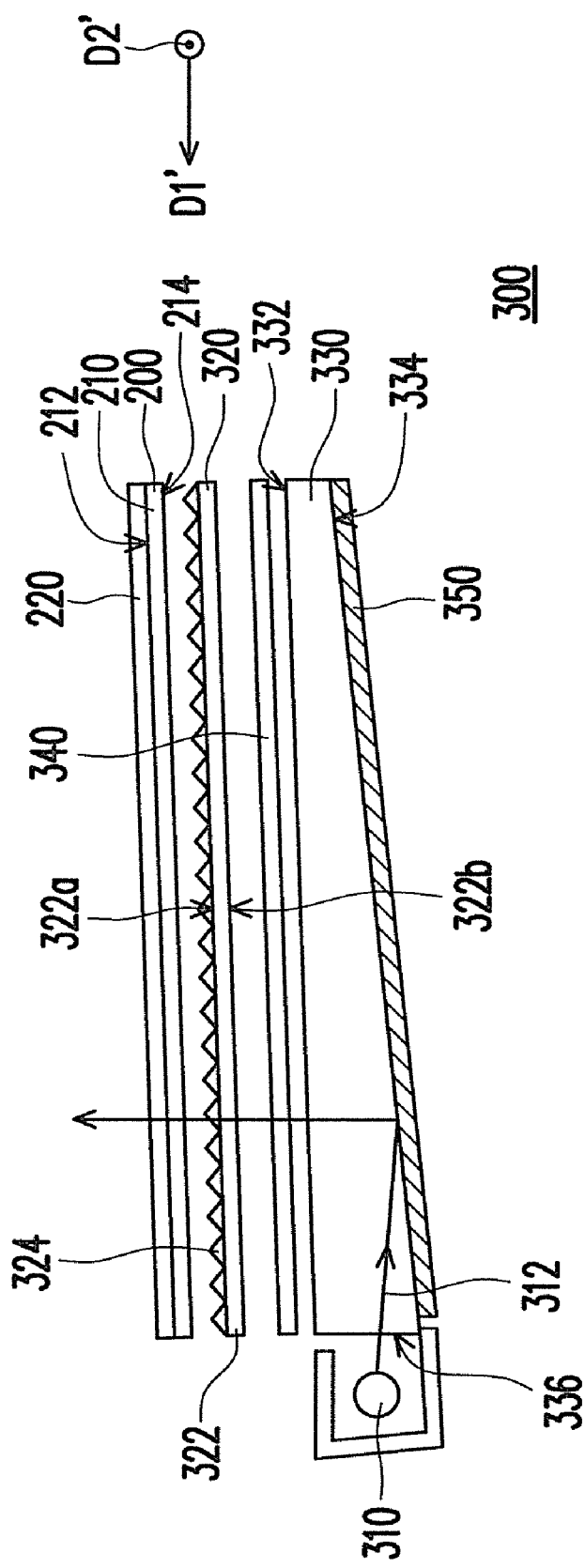
FIG. 8A is a structure diagram of a backlight module according to the sixth embodiment of the present invention.
Figure 8B:
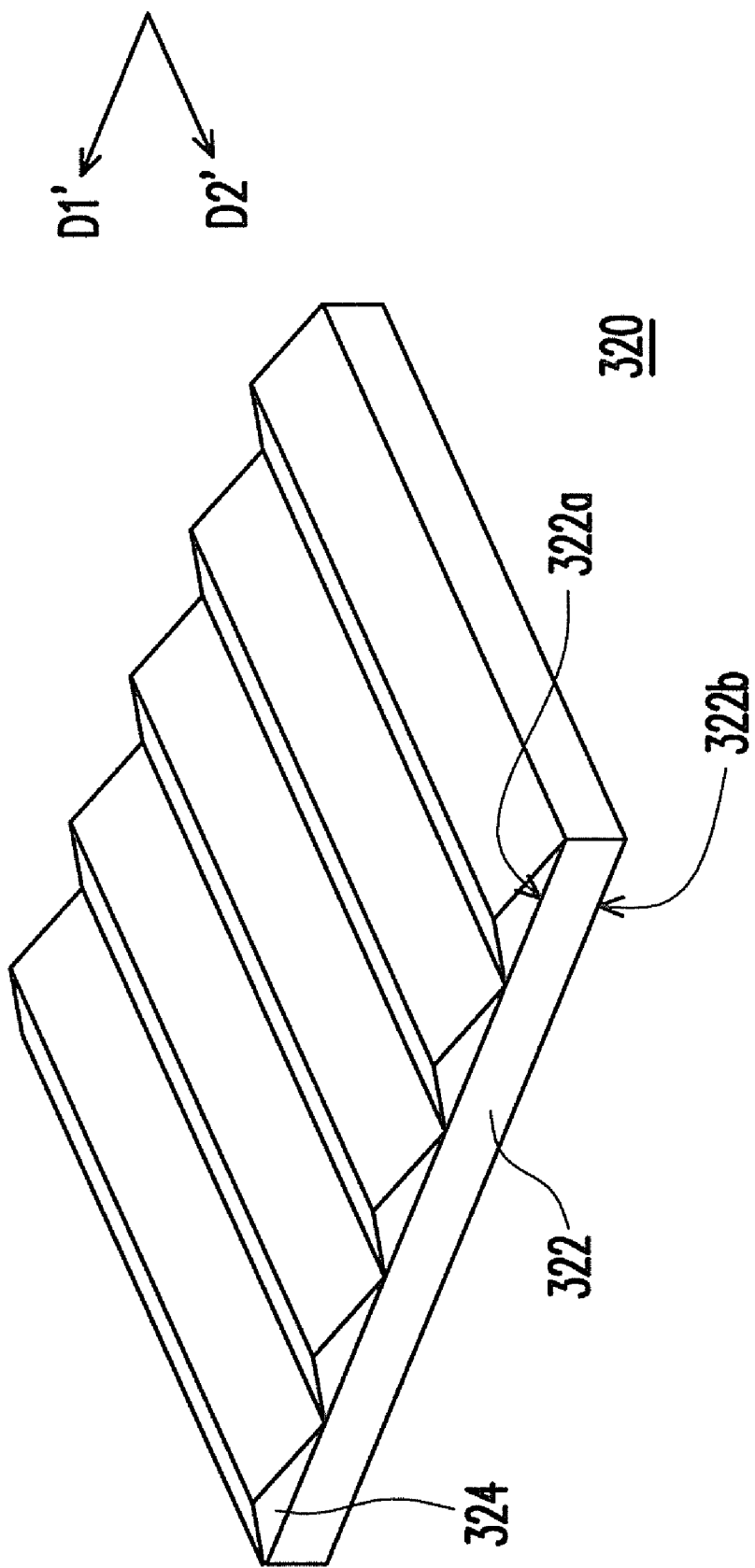
FIG. 8B is a three dimensional diagram of the prism sheet 320 in FIG. 8A.

FIG. 8A is a structure diagram of a backlight module according to the sixth embodiment of the present invention, and FIG. 8B is a three dimensional diagram of the prism sheet 320 in FIG. 8A. Referring to FIGS. 8A and 8B, a backlight module 300 of the embodiment includes a light emitting element 310 and the above-mentioned prism sheet 200. The light emitting element 310 is capable of emitting a light beam 312. In the embodiment, the light emitting element 310 is, for example, a CCFL. However, in other embodiments, the light emitting element 310 may be a plurality of light emitting diodes (LEDs) or other light emitting elements to replace the CCFL. The prism sheet 200 is disposed in the transmission path of the light beam 312. In more detail, the transparent substrate 210 of the prism sheet 200 has a first surface 212 and a second surface 214, both the first surface 212 and the second surface 214 are disposed in the transmission path of the light beam 312, and the second surface 214 is located between the light emitting element 310 and the first surface 212. In the embodiment, the backlight module 300 further includes another prism sheet 320 disposed in the transmission path of the light beam 312 and located between the light emitting element 310 and the prism sheet 200. The prism sheet 320 includes a transparent substrate 322 and a plurality of prism rods 324. The transparent substrate 322 has a third surface 322a and a fourth surface 322b, which are opposite to each other. The prism rods 324 are disposed on the third surface 322a, wherein each of the prism rods 324 extends along a second direction D2', and the prism rods 324 are arranged along a first direction D1'. In other words, in the embodiment, the extending direction of the prism rods 324 is substantially perpendicular to the extending direction of the prism rods 220 of the prism sheet 200.

In the embodiment, the backlight module 300 further includes a light guide plate (LGP) 330 which has a fifth surface 332, a sixth surface 334 opposite to the fifth surface 332, and a light incident surface 336 connecting the fifth surface 332 and the sixth surface 334. The light beam 312 emitted from the light emitting element 310 enters the LGP 330 through the light incident surface 336, and is then transmitted to the prism sheet 320 through the fifth surface 332. In the embodiment, a diffuser 340 may be disposed between the fifth surface 332 and the prism sheet 320, so that the backlight module 300 may provide a uniform surface light source. In addition, a reflection unit 350 may be disposed at a side of the sixth surface 334 of the LGP 330 to reflect the light beam 312 onto the fifth surface 332.

In the backlight module 300 of the embodiment, since the prism sheet 200 may effectively reduce the influence of the dispersion phenomenon on the color uniformity of the emitted light, the backlight module 300 is able to provide a surface light source with uniform color. Besides, since the optical grating structures 230 (as shown in FIG. 2A) of the prism sheet 200 may fog the profile of the prism rods 220, the backlight module 300 is able to provide a surface light source with more uniform brightness, and it may be saved to dispose a diffuser at a side of the prism sheet 200 opposite to the prism sheet 320 for reducing the cost and the light loss.

When a liquid crystal panel (not shown) is disposed over the prism sheet 200, since the optical grating structures 230 may fog the profile of the prism rods 220, the moire fringes and the Newton rings generated by the prism rods 220 and the pixel structure of the liquid crystal panel may be effectively suppressed.

It should be noted that the prism sheet 200 in the backlight module 300 may be replaced by the above-mentioned prism sheet (for example, the prism sheet 200b, 200c or 200d) of other embodiments so as to form a backlight module of other types. The prism sheet 320 in the backlight module 300 may be also replaced by the above-mentioned prism sheet (for example, the prism sheet 200a-200d) of other embodiments so as to form a backlight module of other types.

The Seventh Embodiment

Figure 9:
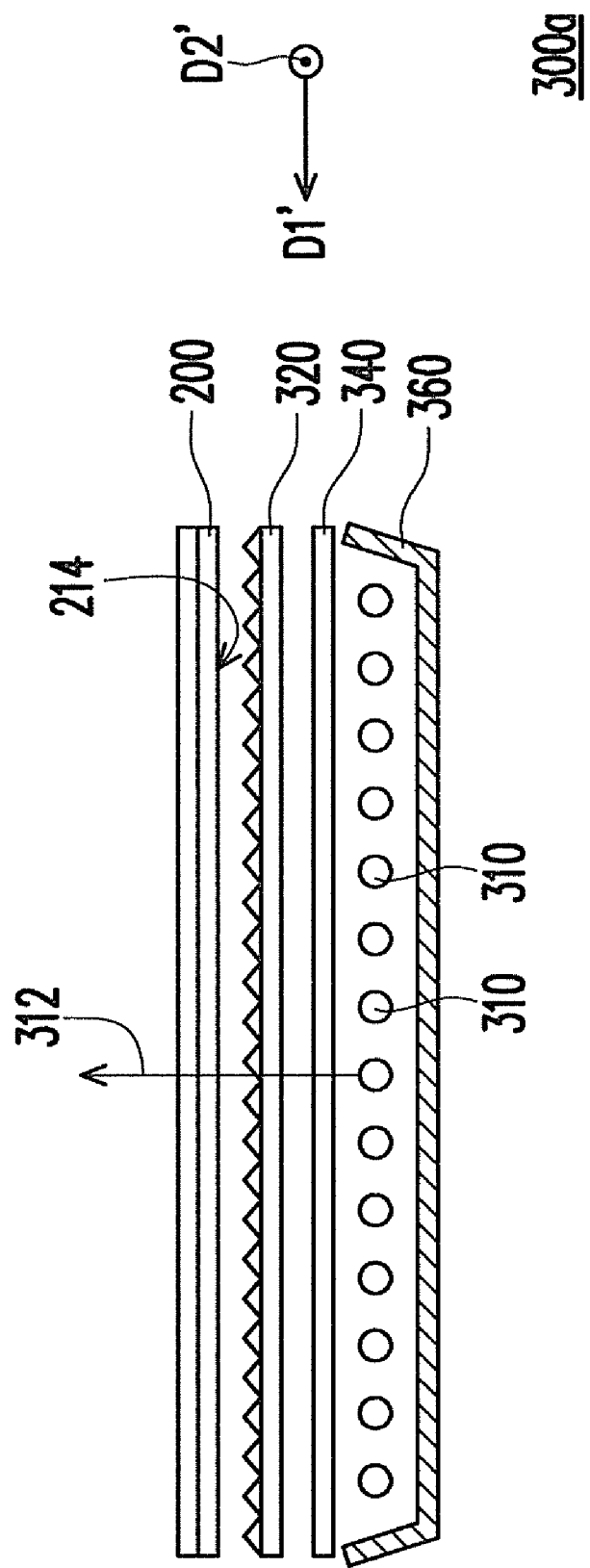
FIG. 9 is a structure diagram of a backlight module according to the seventh embodiment of the present invention.

FIG. 9 is a structure diagram of a backlight module according to the seventh embodiment of the present invention. Referring to FIG. 9, the backlight module 300a of the embodiment is similar to the above-mentioned backlight module 300 (as shown in FIG. 8A), and the differences between them are as follows. The backlight module 300a does not have the LGP, and a plurality of light emitting elements 310 is disposed under the prism sheet 200. In other words. the second surface 214 of the prism sheet 200 faces the light emitting elements 310. In the embodiment, the light emitting elements 310 may be located under the diffuser 340 and in a light box 360. The backlight module 300a has the advantages and the effect similar to those of the backlight module 300, which will not be repeated herein.

It should be noted that the prism sheet 200 in the backlight module 300a may be replaced by the above-mentioned prism sheet (for example, the prism sheet 200b, 200c or 200d) of other embodiments so as to form a backlight module of other types. The prism sheet 320 in the backlight module 300a may be also replaced by the above-mentioned prism sheet (for example, the prism sheet 200a-200d) of other embodiments so as to form a backlight module of other types.

The Eighth Embodiment

Figure 10:
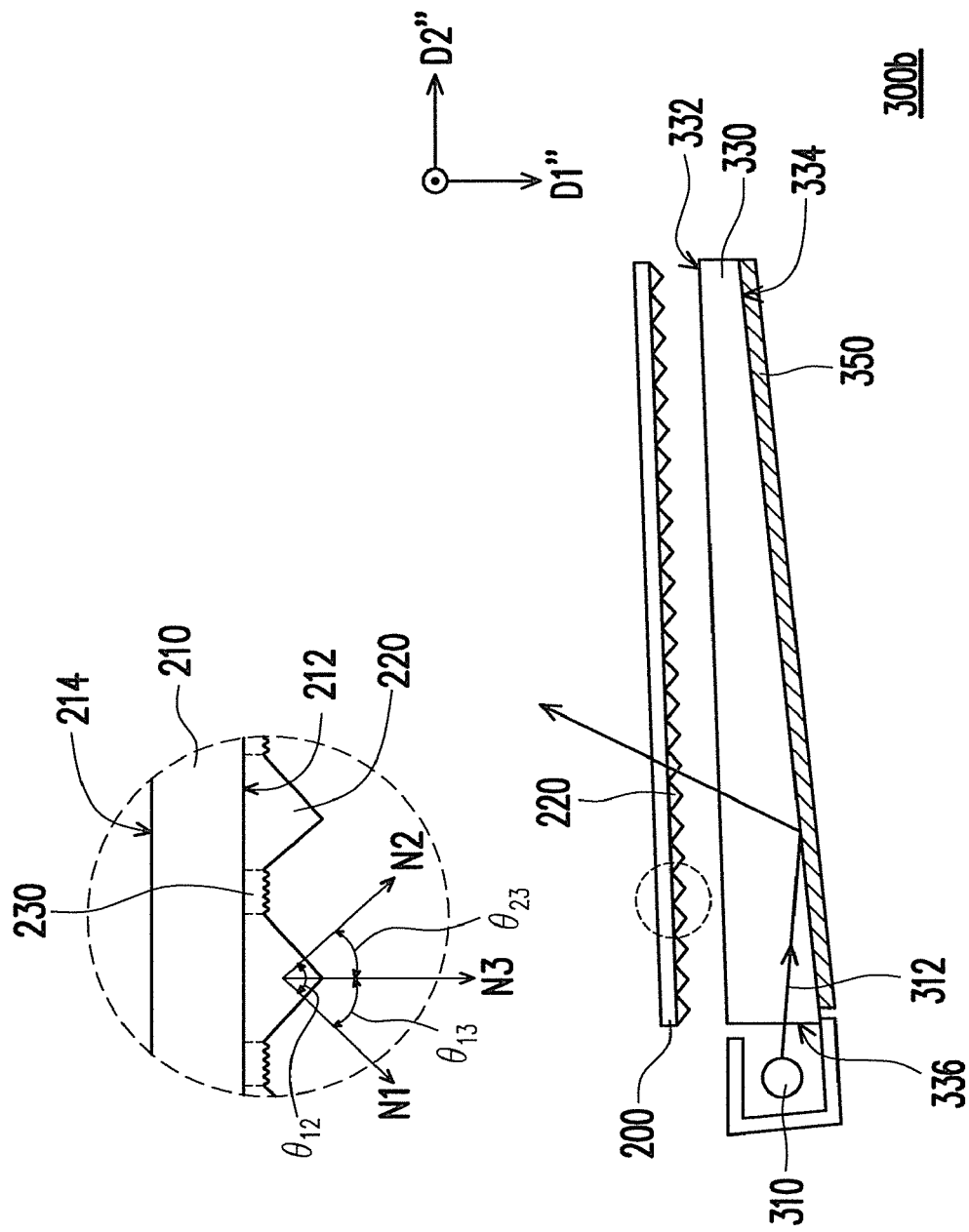
FIG. 10 is a structure diagram of a backlight module according to the eighth embodiment of the present invention.

FIG. 10 is a structure diagram of a backlight module according to the eighth embodiment of the present invention. Referring to FIG. 10, the backlight module 300b of the embodiment is similar to the above-mentioned backlight module 300 (as shown in FIG. 8A), and the differences between them are as follows. In the backlight module 300b of the embodiment, the prism sheet 200 in the backlight module 300 of FIG. 8A is disposed upside down and with the rotation angle of 90° so that a first direction D1" (the extending direction of the prism rods 220) and a second direction D2" (the arrangement direction of the prism rods 220) are oriented as shown in FIG. 10. In other words, the first surface 212 and the second surface 214 of the transparent substrate 210 of the prism rods 220 are located in the transmission path of the light beam 312, and the first surface 212 is located between the light emitting element 310 and the second surface 214. The backlight module 300b of the embodiment has the advantages and the effect similar to those of the above-mentioned backlight module 300 (as shown in FIG. 8A), which are not repeated herein.

In the embodiment, the included angle $\theta_{13}$ between the first normal vector N1 and the third vector N3 of the prism rod 220 is substantially equal to the included angle $\theta_{23}$ between the second normal vector N2 and the third normal vector N3 thereof. In other embodiments, the included angle $\theta_{13}$ may, however, be different from the included angle $\theta_{23}$. For example, in other embodiments, the included angle $\theta_{12}$ ranges from 110° to 130°, the included angle $\theta_{23}$ ranges from 40° to 60°, and the included angle $\theta_{13}$ ranges from 60° to 80°.

It should be noted that the prism sheet 200 in the backlight module 300b may be replaced by the above-mentioned prism sheet (for example, the prism sheet 200b, 200c or 200d) of other embodiments so as to form a backlight module of other types.

In summary, the prism sheet in the embodiments of the present invention has the optical grating structure in addition to the prism rods. Since the dispersion phenomenon caused by the diffraction effect of the optical grating structure countervails at least one part of the dispersion phenomenon caused by the refraction effect of the prism rods, the prism sheet of the embodiments of the present invention is able to effectively reduce the influence of the dispersion phenomenon on the color uniformity of the emitted light, which increases the color uniformity of the surface light source provided by the backlight module using the prism sheet.

Besides, the diffraction nature of the optical grating structures may be used to fog the profile of the prism rods, such that the backlight module using the prism sheet may provide a surface light source with more uniform brightness. Moreover, when a liquid crystal panel is disposed over the prism sheet, the moire fringes and the Newton rings generated by the prism rods and the pixel structure of the liquid crystal panel may be effectively suppressed. The diffraction effect of the optical grating structures is able to fog the defects on the prism rods as well, which makes the defects not easily observed so as to further increase the production yield of the prism sheet and the uniformity of the surface light source provided by the backlight module.

The above described are preferred embodiments of the present invention only, which do not limit the implementation scope of the present invention. It will be apparent to those skilled in the art that various modifications and equivalent variations can be made to the structure of the present invention without departing from the scope or spirit of the invention. In view of the foregoing, it is intended that the present invention covers modifications and variations of this invention provided they fall within the scope of the following claims and their equivalents. In addition, any one of the embodiments of the present invention or any one of the claims is not necessarily to achieve all the objectives, all the advantages or all the features disclosed by the present invention. Moreover, the abstract of the disclosure and the title are intended to aid patent searching, not to limit the claim scope of the present invention.

What is claimed is:

1. A prism sheet, comprising:
   a transparent substrate, having a first surface and a second surface opposite to the first surface;
   a plurality of prism rods, disposed on the first surface, wherein each of the prism rods extends along a first direction, and the prism rods are arranged along a second direction; and
   at least one optical diffractive grating structure for producing diffraction effect so as to produce dispersion phenomenon, the optical diffractive grating structure being disposed on the first surface and located between two adjacent ones of the prism rods, wherein the optical diffractive grating structure extends along the first direction.

2. The prism sheet according to claim 1, wherein the first direction is substantially perpendicular to the second direction.

3. The prism sheet according to claim 1, wherein the optical diffractive grating structure has an optical grating surface facing away from the transparent substrate and comprises a plurality of protrusive strips located at the optical grating surface.

4. The prism sheet according to claim 3, wherein the ratio of the width of the optical grating surface in the second direction over the pitch of each two adjacent ones of the prism rods in the second direction ranges from 3% to 50%.

5. The prism sheet according to claim 3, wherein each two adjacent ones of the protrusive strips have a pitch in the first direction or the second direction, and the pitch ranges from 0.5 μm to 3 μm.

6. The prism sheet according to claim 3, wherein each of the protrusive strips extends along the first direction, and the protrusive strips are arranged along the second direction.

7. The prism sheet according to claim 3, wherein each of the protrusive strips extends along the second direction, and the protrusive strips are arranged along the first direction.

8. The prism sheet according to claim 3, wherein the protrusive strips are sorted into a plurality of first protrusive strips and a plurality of second protrusive strips, each of the first protrusive strips extends along the first direction, and the first protrusive strips are arranged along the second direction; each of the second protrusive strips extends along the second direction and the second protrusive strips are arranged along the first direction; the first protrusive strips and the second protrusive strips are interlaced with each other.

9. The prism sheet according to claim 1, wherein each of the prism rods has:
   a first prismatic surface, located at a side of the transparent substrate and having a first normal vector; and
   a second prismatic surface, located at the same side of the transparent substrate where the first prismatic surface is located, connecting the first prismatic surface and having a second normal vector, wherein the included angle between the first normal vector and the second normal vector ranges from 70° to 110°.

10. The prism sheet according to claim 9, wherein the first surface has a third normal vector, and the included angle between the first normal vector and the third normal vector ranges from 35° to 55°.

11. The prism sheet according to claim 9, wherein the boundary between the first prismatic surface and the second prismatic surface of each of the prism rods is a crest line extending along the first direction.

12. The prism sheet according to claim 1, wherein the pitch of each two adjacent ones of the prism rods in the second direction ranges from 30 µm to 150 µm.

13. The prism sheet according to claim 1, wherein the at least one optical diffractive grating structure is a plurality of optical diffractive grating structures, and the width of each of the optical diffractive grating structures in the second direction is the same as the others.

14. The prism sheet according to claim 1, wherein the at least one optical diffractive grating structure is a plurality of optical diffractive grating structures, and the width of each of the optical diffractive grating structures in the second direction is at least partially different from each other.

15. The prism sheet according to claim 1, wherein the optical diffractive grating structure and the prism rods are integrally formed.

16. The prism sheet according to claim 1, further comprising at least one connecting structure connecting another two adjacent ones of the prism rods, wherein the connecting structure has a connecting surface facing away from the transparent substrate and connecting the first prismatic surface of one of the another two adjacent prism rods and the second prismatic surface of the other one of the another two adjacent prism rods.

17. A backlight module, comprising:
  at least one light emitting element, capable of emitting a light beam; and
  a first prism sheet, disposed in the transmission path of the light beam, wherein the first prism sheet comprises:
    a first transparent substrate, having a first surface and a second surface opposite to the first surface;
    a plurality of first prism rods, disposed on the first surface, wherein each of the first prism rods extends along a first direction, and the first prism rods are arranged along a second direction; and
    at least one optical diffractive grating structure for producing diffraction effect so as to produce dispersion phenomenon of the light beam, the optical diffractive grating structure being disposed on the first surface and located between two adjacent ones of the prism rods, wherein the optical diffractive grating structure extends along the first direction.

18. The backlight module according to claim 17, further comprising a second prism sheet, disposed in the transmission path of the light beam and located between the light emitting element and the first prism sheet, wherein the second prism sheet comprises:
  a second transparent substrate, having a third surface and a fourth surface opposite to the third surface; and
  a plurality of second prism rods, disposed on the third surface, wherein each of the second prism rods extends along the second direction and the second prism rods are arranged along the first direction.

19. The backlight module according to claim 17, wherein the optical diffractive grating structure has an optical grating surface facing away from the transparent substrate and comprises a plurality of protrusive strips located at the optical grating surface.

20. The backlight module according to claim 17, wherein both the first surface and the second surface are located in the transmission path of the light beam, and the second surface is located between the light emitting element and the first surface.

* * * * *